W. F. WARNER.
ENSILAGE CUTTER.
APPLICATION FILED DEC. 29, 1915.
1,304,001.
Patented May 20, 1919.
2 SHEETS—SHEET 1.
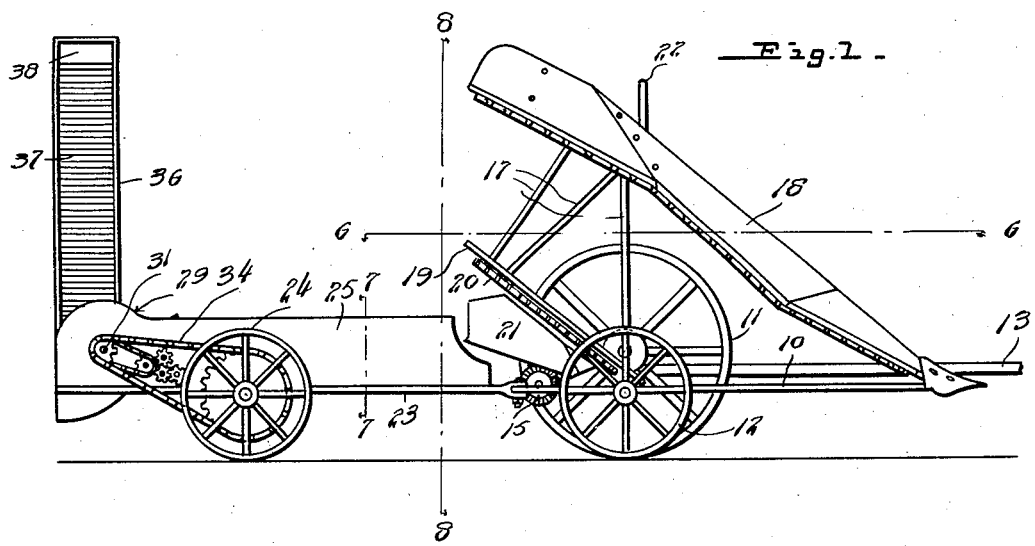
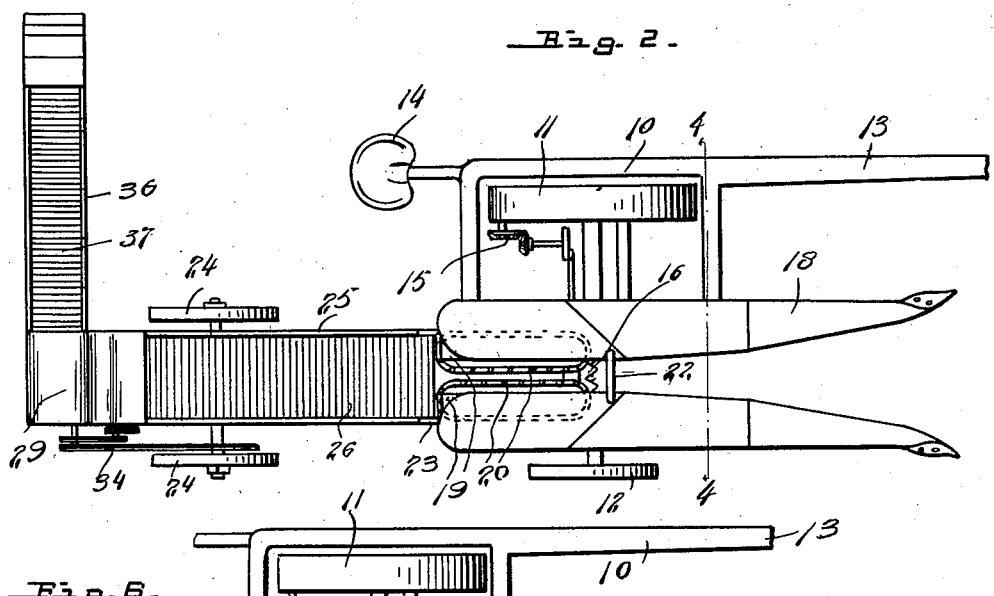

W. F. WARNER.
ENSILAGE CUTTER.
APPLICATION FILED DEC. 29, 1915.
1,304,001.
Patented May 20, 1919.
2 SHEETS—SHEET 2.
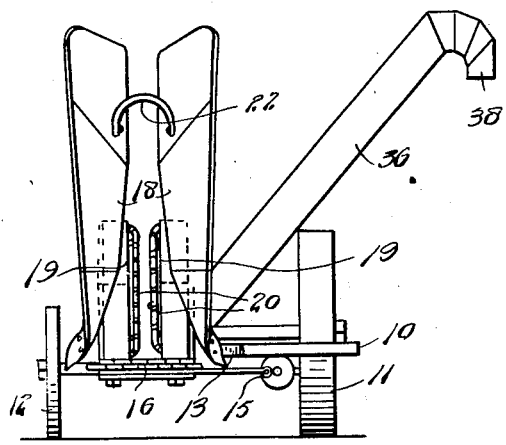
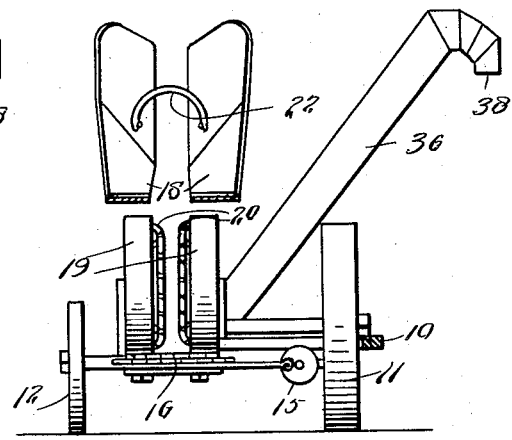
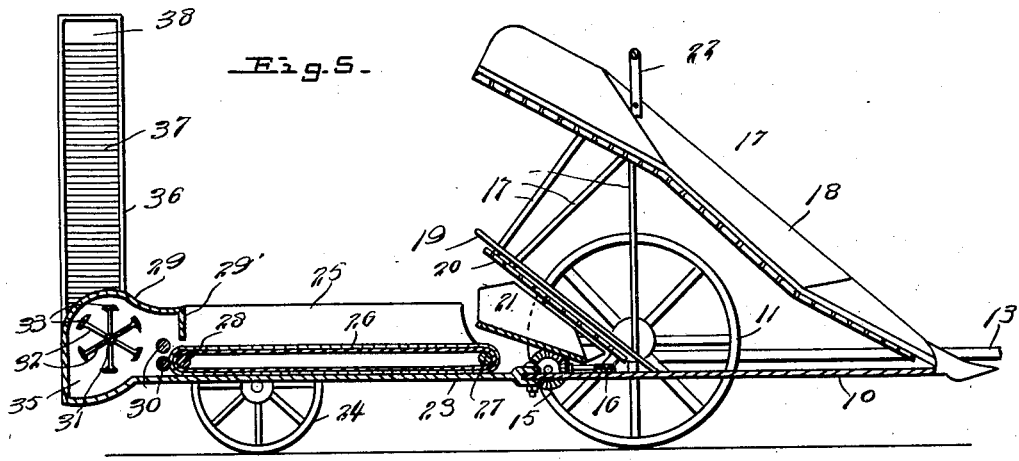
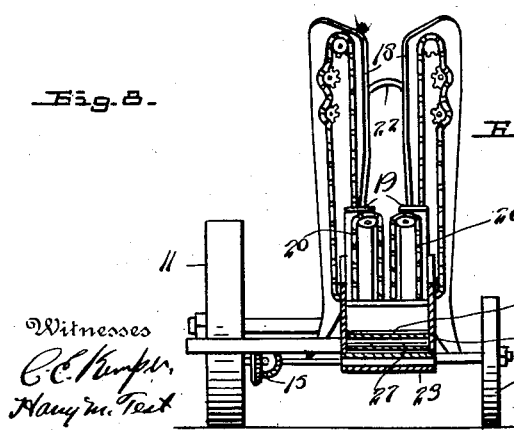
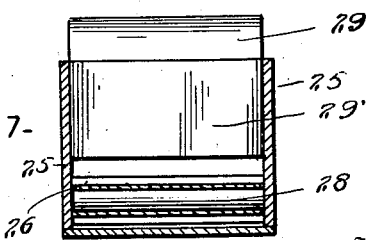
Inventor
W. F. Warner.

UNITED STATES PATENT OFFICE.

WILLIAM F. WARNER, OF FREDERICKSBURG, IOWA.

ENSILAGE-CUTTER.

1,304,001.　　　Specification of Letters Patent.　　Patented May 20, 1919.

Application filed December 29, 1915. Serial No. 69,202.

*To all whom it may concern:*

Be it known that I, WILLIAM F. WARNER, a citizen of the United States, residing at Fredericksburg, in the county of Chickasaw, State of Iowa, have invented certain new and useful Improvements in Ensilage-Cutters; and I do hereby declare the following to be a full, clear, and exact description of the invention, such as will enable others skilled in the art to which it appertains to make and use the same.

This invention relates to improvements in ensilage cutting machines.

One object of the invention is to provide a novel and efficient machine of this character whereby the stalks can be fed in a continuous stream and be effectively and quickly chopped into small pieces and conveyed to a suitable receptacle.

Another object of the invention is to provide a machine for cutting the standing fodder plants, and automatically presenting the stalks after they have been cut down, butts first to the chopper.

Another object is to provide a machine for harvesting and chopping fodder or ensilage in an efficient manner without danger of clogging at any point in the machine.

Other objects and advantages will be apparent from the following description, when taken in connection with the accompanying drawings.

In the drawings:

Figure 1 is a side elevation of the improved ensilage harvester and chopper.

Fig. 2 is a top plan view thereof.

Fig. 3 is a front elevation.

Fig. 4 is a vertical transverse sectional view on the line 4—4 of Fig. 2.

Fig. 5 is a vertical longitudinal sectional view on the line 5—5 of Fig. 2.

Fig. 6 is a horizontal sectional view on the line 6—6 of Fig. 1.

Fig. 7 is a transverse sectional view on the line 7—7 of Fig. 1.

Fig. 8 is a vertical transverse sectional view on the line 8—8 of Fig. 1.

Referring particularly to the accompanying drawings, 10 represents a horizontal frame which is supported by the master drive wheel 11 and the auxiliary supporting wheel 12. A draft tongue 13 and driver's seat 14 are suitably secured to the frame. A cutter member 16 arranged adjacent the forward end of the frame is driven by gearing 15 deriving its power from the master wheel 11. Also carried on this frame by means of the supports 17 are the inclined shield boards 18. Below the upper ends of the shield boards 18 and carried by the frame 10 is an upward and rearwardly inclined divided support 19, on which are mounted the parallel stalk conveying chains 20. Below these chains is an upwardly and rearwardly inclined slide board 21 on which the butts of the stalks slide as they are moved rearwardly by the chains 20. Across the upper portions of the shield boards 18 is an arch 22 against which the upper portions of the stalks engage while the chains 20 pull the butts rearwardly and present the butts in the direction of travel of the stalk.

Coupled to the rear of the frame 10 is another frame 23, this frame being supported by the wheels 24. This frame has the side boards 25 between which boards runs a longitudinal conveyer belt 26, said belt being trained around the rollers 27 and 28 which are disposed at the forward and rear ends of the frame 23 respectively. At the rear of the frame 23 is mounted a casing 29 in which are mounted the transversely extending and superposed feed rollers 30. Also mounted in the casing to the rear of the rollers is a shaft 31 on which are mounted a plurality of radial arms 32 carrying chopping blades 33 on their extremities. The shaft 31 is driven by the chain 34 from the supporting wheel 24, this shaft 31 in turn driving the conveyer belt 26. The bottom of the casing 29 is formed with a downwardly and laterally inclined chute 35 to which is connected the laterally extending upwardly inclined delivering chute 36, this chute having mounted therein an endless conveyer belt 37. The upper end of the chute 36 has a suitable discharge spout 38 for delivering the chopped ensilage to a wagon (not shown) which travels alongside of the machine.

In the operation of the machine, the machine is driven down a row of standing stalks so that the stalks of the row will be disposed between the boards 18. The cutter bar 16 severs the stalk just above the ground, immediately upon which the chains 20 grasp the butt of the stalk and move the same upwardly and rearwardly. The arched brace 22 engages and holds the upper portion of the stalk while the chains 20 move the butt to the rear. The stalk is thus forced to fall down with its butt presented to the rear, the stalk falling onto the conveyer belt 26 which carries it to the rear end of the frame 23 and presents the butt to the chopper on the shaft 31. The stalk is thus cut into small pieces, and the pieces caused to fall into the chute 35 and be conveyed up the chute 36 where they are delivered at one side of the machine.

It will of course be understood that as soon as one stalk is cut from its standing position, the machine is proceeding to the next standing stalk, so that the operation above described is repeated continuously as the machine moves forward. Thus the butt end of each stalk, as it is delivered onto the belt 26 is disposed a slight distance to the rear of the butt of the preceding stalk. From this manner of feeding the stalks, it will be seen that there is very little chance for the machine to clog at either the chains 20 or at the chopping knife.

The forward end of the casing 29 has a depending baffle plate 29' which prevents the stalks from passing over the upper roller, thus forcing the stalks to pass between the rollers.

What is claimed is:

In a mechanism of the character described, the combination with a chopping mechanism including an ensilage cutting reel having a horizontal axis and knives disposed parallel to said axis, which is transverse to the direction of the conveyer belt, of horizontal rollers in advance of the knives, a horizontal conveyer belt extending forwardly from the feed rollers with its conveying surface above the entering space between the rollers, a baffle plate in front of said rollers and above said conveyer to assist in directing the butts between the rollers, upper and lower conveyer chains in advance of the conveyer belt and substantially in the plane thereof, a stop above the upper chains and extending directly over the space between them and in the path of the upper ends of the fed stalks in advance of the rear ends of the lower chains for stopping the upper ends of stalks contacting therewith, and cutting mechanism in advance of the chains and from which the chains are adapted to receive the cut stalks, the conveyer belt being of a length less than that of a stalk, whereby the stalks will be slid one from another by the conveyer belt to the feeding rolls, butt end first.

In testimony whereof, I affix my signature, in the presence of two witnesses.

WILLIAM F. WARNER.

Witnesses:
S. B. WEST,
F. D. DANIELS.